Figure 1:
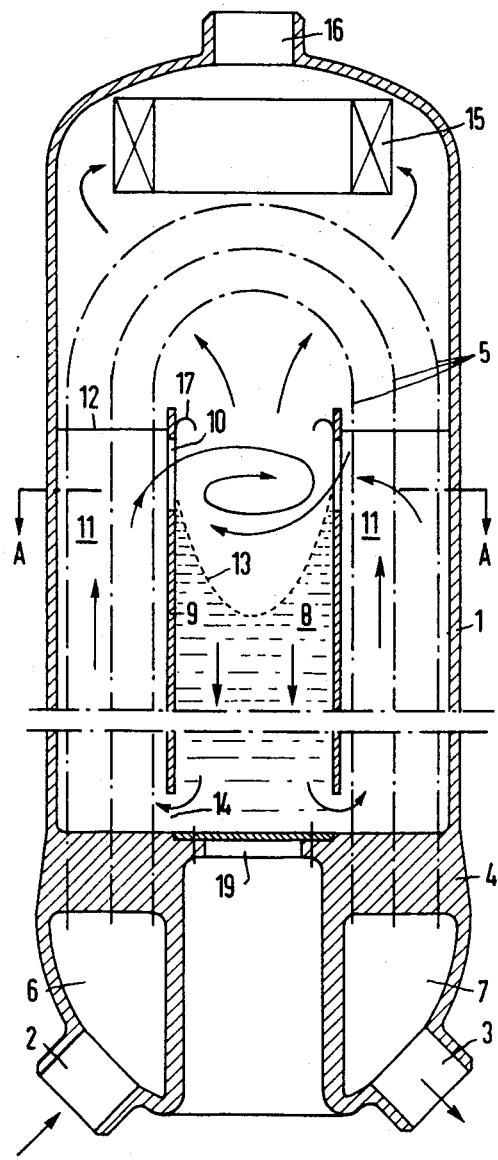

United States Patent [19]

Michel

[11] 3,722,479
[45] Mar. 27, 1973

[54] STEAM GENERATOR FOR PRESSURIZED WATER NUCLEAR REACTOR

[75] Inventor: Eberhard Michel, Nurnberg, Germany

[73] Assignee: Siemens Aktiengesellschaft, Berlin, Germany

[22] Filed: Feb. 22, 1971

[21] Appl. No.: 117,551

[30] Foreign Application Priority Data

Feb. 26, 1970 Germany..................P 20 09 016.8

[52] U.S. Cl....................................122/34, 122/491
[51] Int. Cl..................................................F22b 1/16
[58] Field of Search..........................122/32, 34, 491

[56] References Cited

UNITED STATES PATENTS

| 3,147,743 | 9/1964 | Romanos | 122/32 |
| 3,298,358 | 1/1967 | Alden, Jr. | 122/34 |
| 3,437,077 | 4/1969 | Ammon et al. | 122/32 |

Primary Examiner—E. Kenneth W. Sprague
Attorney—Curt M. Avery, Arthur E. Wilfond, Herbert L. Lerner and Daniel J. Tick

[57] ABSTRACT

In a steam generator for pressurized water nuclear reactors having an upright U-tube bundle of heating surface members, there is provided in the center of the U-tube bundle, a cylindrical hollow chamber serving as preseparator of a steam-water mixture supplied tangentially thereto from a region of the generator wherein the vertically extending legs of the U-tube bundle are located.

9 Claims, 2 Drawing Figures

PATENTED MAR 27 1973 3,722,479

STEAM GENERATOR FOR PRESSURIZED WATER NUCLEAR REACTOR

My invention relates to steam generator for pressurized water nuclear reactors.

In general, only steam having a relatively high moisture content can be produced in saturated steam generators of pressurized water reactors. The separation of the water still contained in the saturated steam requires great cost in construction in that, for example, large steam chambers must be provided above the U-tube heat exchanger proper, and further requires costly installations for separating the water and steam. For this purpose, generally one or more cyclone preseparators are employed in the steam chamber above the U-tube bundle, as well as an after-connected fine separator.

The large steam chambers for the water separators take up however, a considerable part of the volume of the steam generator proper and thereby also have an effect upon the dimensions of the reactor building or contaminent structure per se. Due to the size of the steam generator, especially for high outputs, transportation thereof in assembled condition to some extent is actually impossible and therefor requires the assembly thereof only in situ.

It is accordingly an object of my invention to provide steam generator wherein an early preseparation of the water and a repeated drying of the steam that is generated is possible within the heat exchanger proper, and wherein, moreover, a very compact construction is produced.

Consequently, my invention is an improvement over a conventional natural circulation steam generator having an upright U-tube heating surface bundle conducting a primary medium and wherein a secondary medium flows from the bottom to the top between the tubes of the U-tube bundle and accordingly vaporizes.

With the foregoing and other objects in view, I accordingly provide in the center of the U-tube bundle a cylindrical hollow chamber serving as preseparator for a steam-water mixture supplied substantially tangentially thereto from the vicinity of the vertically extending legs of the U-tube bundle, the hollow chamber serving simultaneously as fall space for natural circulation.

In accordance with another feature of the invention, the hollow chamber is defined by a cylindrical guide jacket formed with substantially tangentially extending inlet slits for the steam-water mixture, surrounding the guide jacket in the upper region thereof.

In accordance with another feature of the invention, I provide a riser space containing the vertically extending legs of the U-tube bundle and defined by the guide jacket and the outer casing of the steam generator, the riser space being located above the substantially tangentially extending inlet slits in the guide jacket and closed by a horizontally extending baffle or deflecting plate.

The steam-water mixture flows from the outside out of the riser space into the hollow chamber through the substantially tangentially inlet slits in the upper region of the guide jacket. The rotation arising from the high flow velocity effects a separation of the water and steam. The water flows downwardly due to the high specific weight thereof, while the steam is withdrawn in an upward direction and is passed through the remainder of the heating surfaces, so that a complete drying and also a slight superheating of the steam is possible due to the supplied heat.

In accordance with an added feature of the invention, the guide jacket proper is formed at a lower end thereof with outlet slits for water flowing out of the hollow chamber preseparator in a downward and radially outward direction into the riser space. Furthermore, in accordance with an added feature of the invention, there is provided at the upper end of the guide jacket and on the inner surface thereof, a collecting or capture trough opening downwardly for limiting the flow of water in an upward direction.

In accordance with a concomitant feature of the invention and for providing an improved means for supplying the steam-water mixture, the inlet slits on the outer surface of the cylindrical guide jacket are provided with guide plates or sheets.

Other features which are considered as characteristic for the invention are set forth in the appended claims.

Although the invention is illustrated and described herein as embodied in steam generator for pressurized water nuclear reactor, it is nevertheless not intended to be limited to the details shown, since various modifications and structural changes may be made therein without departing from the spirit of the invention and within the scope and range of equivalents of the claims.

Figure 2:
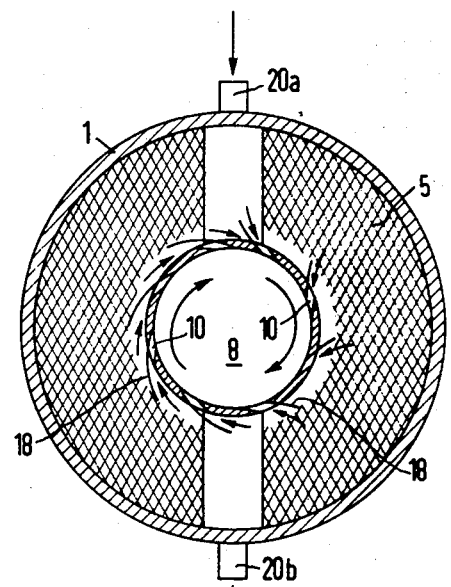

The construction and method of operation of the invention, however, together with additional objects and advantages thereof will be best understood from the following description of specific embodiments when read in connection with the accompanying drawing, in which:

FIG. 1 is a diagrammatic longitudinal sectional view of a steam generator constructed in accordance with my invention; and FIG. 2 is a cross sectional view of FIG. 1 taken along the line II—II in the direction of the arrows.

Referring now to the drawing, there is shown in FIGS. 1 and 2 a steam generator proper constructed in accordance with my invention and formed of a cylindrical casing 1 having a supply tube 2 and a discharge tube 3 for a primary medium. A U-tube bundle 5 is mounted in a conventional manner on the tube floor or plate 4 located in a lower region of the casing 1. The primary medium flowing in through the supply tube 2 and a supply chamber 6, traverses the U-tube bundle 5 and discharges through the outlet chamber 7 and the tube 3. A secondary medium, which is water in the case at hand, flows upwardly from below about and around the U-tube bundle 5, a portion thereof being vaporized in the process.

In accordance with a feature of the invention, a cylindrical hollow chamber 8 is provided in the center of the U-tube bundle 5, the chamber being defined by a cylindrical guide jacket 9. The guide jacket 9 extends from the vicinity of the tube floor or plate 4 up to about the end of the vertically extending straight leg portions of the U-tube bundle 5. In the upper region of the guide jacket 9 substantially tangentially extending inlet slits 10 are formed, as shown more clearly in the cross sectional view of FIG. 2.

An annular space defined by the guide jacket 9 and the outer casing 1 of the steam generator, wherein the vertically extending legs of the U-tube bundle 5 are disposed, forms the riser space 11 proper for the vaporizing water. The riser space 11 is closed at a location above the substantially tangential inlet slits 10 by a horizontally disposed baffle or deflecting plate 12 so that the steam-water mixture rising in the riser space 11 is conducted inwardly through the inlet slits 10 into the hollow space 8 acting as pre-separator. Due to the high inlet velocity of the steam-water mixture, an intense rotation occurs in the hollow chamber 8 which effects separation of the water and steam. The boundary line between the separated water and onwardly flowing steam is identified by the dotted line 13. The separated water flows downwardly and out of the hollow chamber 8 through outlet slits 14 formed at the lower end of the guide jacket 9. The secondary medium, namely feedwater, is introduced through the tubes 20a and 20b into the fallspace located below the preseparator, intermixes thereat with the separated and downwardly flowing water and carries out natural circulation due to the fact that the specific weight thereof is greater than that of the water-steam mixture. The steam flowing upwardly, passed through the tube bend of the U-tube bundle 5 at which, due to further supplied heat, complete drying and, if desired, also a slight superheating, is possible.

The steam is then purified of any moisture that may still remain therein, in an after-disposed fine separator 15, located in the embodiment of the generator, shown in FIG. 1, at the top of the generator and is then supplied to a nonillustrated turbine, for example, through a steam outlet 16 located in the dome of the steam generator, as shown in FIG. 1. In order to prevent water flowing through the inlet slits 10 from being entrained in an upward direction by the steam, they are provided with downwardly opening collecting or capture troughs 17 at the upper end and at the inner surface of the guide jacket 19, which hold back the water and direct it downwardly.

Moreover, the inlet slits 10 are provided with guide plates or sheets 18 at the outer surface of the guide jacket 9 which serve for improved feeding or supply of the steam-water mixture.

By means of the cylindrical fallspace within the U-tube bundle 5, it is possible to provide additionally in the center of the tube floor or plate 4, a manhole 19 which permits access to the chamber during the manufacture thereof and also for subsequent inspection thereof.

Thus, with the steam generator constructed in accordance with the invention, a pre-separation of the water is possible whereby the separated steam can also be dried in a part of the U-tube bundle. Moreover, due to the location of the preseparation in the center of the U-tube bundle, a very compact construction of the steam generator which is especially marked by a relatively low structural height, is afforded.

I claim:

1. Steam generator for pressurized water nuclear reactors comprising an upright U-tube heating surface bundle traversible by a primary medium flow, means for conducting a secondary medium upwardly along and between the tubes of said U-tube heating surface bundle so as to vaporize at least part of said secondary medium and form a steam-water mixture in the vicinity of the vertically extending legs of said U-tube heating surface bundle, a cylindrical hollow chamber located in the center of said U-tube heating surface bundle serving as a fall space and preseparator for the steam-water mixture, and means for supplying the steam-water mixture to said hollow chamber from the vicinity of said vertically extending legs of said U-tube heating surface bundle in a direction substantially tangential to said hollow chamber.

2. Steam generator according to claim 1, wherein said hollow chamber is defined by a cylindrical guide jacket formed in the upper region thereof with circumferentially spaced substantially tangentially extending inlet slits for supplying the steam-water mixture therethrough to said hollow chamber.

3. Steam generator according to claim 2 wherein said vertically extending legs of said U-tube heating surface bundle are mounted in a riser space defined by said guide jacket and an outer casing for the steam generator, said riser space being closed by a horizontally extending deflecting plate above said substantially tangentially extending inlet slits formed in said guide jacket.

4. Steam generator according to claim 1 including means for passing steam separated from water out of said preseparator hollow chamber through part of said U-tube heating surface bundle for after-drying the steam.

5. Steam generator according to claim 3 wherein said guide jacket is formed at the lower end thereof with outlet slits for passing water therethrough downwardly and radially outwardly from said preseparator hollow chamber into said riser space.

6. Steam generator according to claim 1 wherein said hollow chamber includes an upper preseparator region and a fall space located therebelow, and including supply tubes communicating with said fall space for supplying feedwater thereto.

7. Steam generator according to claim 2 including a downwardly opening collecting trough located at the inner surface of said guide jacket at the upper end thereof.

8. Steam generator according to claim 3 including guide sheets located at the outer surface of said guide jacket and cooperating with said inlet slits for supplying the steam-water mixture through the latter into said hollow chamber.

9. Steam generator according to claim 1 including a tube floor supporting said U-tube heating surface bundle, said tube floor having a manhole in the center thereof.

* * * * *